United States Patent [19]

Keogh

[11] Patent Number: 4,952,428
[45] Date of Patent: Aug. 28, 1990

[54] FLAME RETARDANT COMPOSITIONS

[75] Inventor: Michael J. Keogh, Bridgewater, N.J.

[73] Assignee: Union Carbide Chemicals and Plastics Company Inc., Danbury, Conn.

[21] Appl. No.: 280,980

[22] Filed: Dec. 7, 1988

[51] Int. Cl.$^5$ ............................................. A01N 3/00
[52] U.S. Cl. .................................... 428/461; 428/921; 428/411.1; 521/92; 521/93; 521/90; 521/98; 521/143; 521/145; 521/146; 521/149; 521/150; 521/907
[58] Field of Search ............... 524/437; 428/19.1, 921; 521/92, 93, 96, 98, 143, 145, 146, 149, 150, 907

[56] References Cited

U.S. PATENT DOCUMENTS

| | | | |
|---|---|---|---|
| 3,922,442 | 11/1975 | North et al. | 524/437 |
| 4,327,001 | 4/1982 | West et al. | 524/437 |
| 4,353,817 | 10/1982 | Nakae et al. | 524/399 |
| 4,381,362 | 4/1983 | Biggs et al. | 524/305 |
| 4,430,470 | 2/1984 | Taniguchi et al. | 524/437 |
| 4,446,254 | 5/1984 | Nakae et al. | 524/437 |
| 4,477,523 | 10/1984 | Biggs et al. | 524/322 |
| 4,533,687 | 8/1985 | Itoh et al. | 524/436 |
| 4,542,164 | 9/1985 | Nishioka et al. | 524/109 |
| 4,593,071 | 6/1986 | Keogh | 524/445 |
| 4,671,896 | 6/1987 | Hasegawa et al. | 524/423 |
| 4,722,959 | 2/1988 | Inoue | 524/436 |
| 4,769,179 | 9/1988 | Kato et al. | 524/140 |
| 4,801,639 | 1/1989 | Hoshi et al. | 524/437 |
| 4,840,987 | 6/1989 | Sakamoto | 524/436 |

*Primary Examiner*—Morton Foelak
*Attorney, Agent, or Firm*—Saul R. Bresch

[57] ABSTRACT

A composition useful in the manufacture of cable comprising:
(i) a crosslinkable thermoplastic polymer;
(ii) a metal hydrate flame retardant compound; and
(iii) an organic peroxide crosslinking compound, which decomposes at a temperature of at least about 140° C., but below the decomposition temperature of the polymer.

11 Claims, No Drawings

FLAME RETARDANT COMPOSITIONS

TECHNICAL FIELD

This invention relates to flame retardant compositions containing an ethylene copolymer and a magnesium hydroxide filler. The compositions are particularly useful in plenum cable.

BACKGROUND ART

Plenum cable is used to carry power through ducts which are used to ventilate, for example, high rise buildings. While a fire occurring in these ducts can be dangerous in its own right, such a conflagration is especially insidious because the smoke and other gases resulting from the fire are transported through the ducts throughout the building, even to parts quite remote from the blaze. In some cases, colorless and odorless gases can invade sleeping quarters housing unsuspecting people.

The cable used in plenum is generally constructed of a metal conductor insulated with a polymeric material. These elements are generally twisted to form a core and are protected by another polymeric sheath or jacket material. In certain cases, added protection is afforded by inserting a wrap between the core and the sheath.

Thermoplastic non halogen polyolefin compounds containing a metal hydrate flame retardant such as magnesium hydroxide or aluminum hydroxide rely on an endothermic heat sink mechanism for flame resistance. Any interference with this mechanism can lead to a significant loss of effectiveness. Dripping, uneven combustion, loss of ash, and premature release of the hydrate are examples of interference, which lower flame resistance.

The art is constantly seeking to reinforce the heat sink mechanism to maintain flame resistance, particularly where duct fires are concerned.

DISCLOSURE OF INVENTION

An object of this invention, therefore, is to provide a composition, which comprises a thermoplastic polyolefin and a metal hydrate flame retardant, and is capable of maintaining its flame resistance when subjected to interfering factors thrust upon it by a duct fire or other conflagration.

Other objects and advantages will become apparent hereinafter.

According to the invention, a composition has been discovered, which meets the above objective. The composition comprises (i) a crosslinkable thermoplastic polymer;
(ii) a metal hydrate flame retardant compound; an
(iii) an organic peroxide crosslinking compound, which decomposes at a temperature of at least about 140° C., but below the decomposition temperature of the polymer.

DETAILED DESCRIPTION

In this specification, the term "polymer" is used to include thermoplastic polymers, i.e., homopolymers and copolymers based on two or more comonomers, conventionally used as jacketing and/or insulating materials in wire and cable products. Generally, the monomers will have 2 to 18 carbon atoms, and preferably 2 to 8 carbon atoms. Examples of monomers useful in the production of these homopolymers and copolymers are ethylene, propylene, 1-butene, 1-hexene, 1 octene, vinyl acetate, ethyl acrylate, ethylidene norbornene, methyl acrylate, styrene, maleic anhydride, acrylonitrile, butadiene, methyl methacrylate, vinyl chloride, vinylidene chloride, tetrafluoroethylene, and ethylene chlorotriflouroethylene. The homopolymers and copolymers referred to can be non-halogenated, or halogenated in a conventional manner, generally with chlorine or bromine. In the case of polyvinyl chloride, polyvinylidene chloride, or polytetraflouroethylene, for example, further halogenation is not necessary to provide the halogenated polymer. In addition to polyolefins, included among the polymers can be polyesters, polycarbonates, and polyurethanes. The homopolymers and copolymers of ethylene are preferred, both in the non-halogenated and halogenated form.

The metal hydrate flame retardant compound can be any of those used conventionally such as magnesium hydroxide (magnesium hydrate) and aluminum hydroxide (alumina trihydrate). A particularly preferred magnesium hydroxide and a method for its preparation are described in U.S. Pat. No. 4,098,762 issued on July 4, 1978. Characteristics of this magnesium hydroxide are (a) a strain in the $<101>$ direction of no more than $3.0 \times 10^{-3}$; (b) a crystallite size in the $<101>$ direction of more than 800 angstroms; and (c) a surface area, determined by the BET method, of less than 20 square meters per gram.

The amount of metal hydrate used in the composition is in the range of about 180 to about 350 parts by weight of metal hydrate per one hundred parts by weight of polymer and is preferably in the range of about 200 to about 320 parts by weight of metal hydrate per one hundred parts by weight of polymer.

The metal hydrate is preferably surface treated with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and preferably about 0.25 to about 3 parts per one hundred parts of metal hydrate. The acid or salt can be merely added to the composition in like amounts rather than using the surface treatment procedure, but this is not preferred.

Component (iii) is an organic peroxide crosslinking compound, which decomposes at a temperature of at least about 140° C., but below the decomposition temperature of the polymer. Those having decomposition temperatures at or close to about 160° C. and no higher then about 200° C. are preferred.

The organic peroxide selected is one, which, under extrusion conditions and normal temperatures of use, will provide essentially no crosslinking, but will decompose at burning or conflagration temperatures to provide free radicals for crosslinking the thermoplastic polymer providing the wire and cable jacketing or insulation. An organic peroxide with at least a one hour half life decomposition temperature can be used. A "half-life" of a peroxide at any specified temperature is the time required at that temperature to effect a loss of one half of the active oxygen content of the peroxide. The half-life is considered to be a measure of decomposition of the organic peroxide. This minimum half-life should insure that essentially no decomposition takes place before the onset of the fire.

Useful organic peroxides are peroxides having the formula ROOR', which decompose at temperatures of less than about 160° C., and hydroperoxides having the formula ROOH, which decompose in the 160° C. to 200° C. range. The former are more efficient crosslinkers; however, the latter are preferred because of their higher decomposition temperatures. Specific organic peroxides are t-butylcumylperoxide; di-tert-butylperoxide; 2,5-dimethyl-2,5-di(t-butylperoxide)(hexyne-3); cumene hydroperoxide; t-butyl hydroperoxide; t-amyl hydroperoxide; and 2,5-dihydro-peroxy-2,5-dimethylhexene.

The amount of organic peroxide, which will provide sufficient crosslinking at conflagration temperatures is in the range of about 0.1 to about 5 parts by weight of organic peroxide per one hundred parts by weight of polymer. A preferred amount of organic peroxide is in the range of about 0.5 to about 2 parts by weight of organic peroxide for each one hundred parts by weight of polymer.

Other useful additives for subject composition are coupling agents, surfactants, filler or polymer reinforcing additives, antioxidants, ultraviolet stabilizers, antistatic agents, pigments, dyes, slip agents, plasticizers, lubricants, viscosity control agents, extender oils, metal deactivators, water tree growth retardants, and voltage stabilizers, flame retardant additives, and smoke suppressants. Some of the more important additives are discussed below.

A coupling agent is a chemical compound, which chemically binds polymer components to inorganic components. This is effected by a chemical reaction taking place at the temperatures under which the formulation is compounded, about 70° C. to about 180° C. The coupling agent generally contains an or/ganofunctional ligand at one end of its structure which interacts with the backbone of the polymeric component and a liqand at the other end of the structure of the coupling compound which attaches through reaction with the surface of the filler. The following silane coupling agents are useful in subject composition: gamma-methacryloxypropyltrimethoxy silane; methyltriethoxy silane; methyltris (2-methoxyethoxy) silane; dimethyldiethoxy silane; vinyltris(2- methoxyethoxy) silane; vinyltrimethoxy silane; and vinyltriethoxy silane; and mixtures of the foregoing. A preferred silane coupling agent is a mixture of gamma-methacryloxypropyltrimethoxy silane and vinyltriethoxysilane. This mixture is described in U.S. Pat. No. 4,481,322.

Useful reinforcing additives include polymerizable unsaturated organic compounds having at least two polymerizable unsaturated groups. It is believed that the reinforcing additive reacts chemically with the thermoplastic polymer matrix during the hot melt compounding of the filled thermoplastic polymer. It is further believed that the reinforcing additive causes the formation of a strong and tough interphase between the individual filler particles and the surrounding matrix polymer, enabling the polymer to withstand the local stress concentrations caused by the filler particles, which might otherwise result in matrix crack initiation and catastrophic failure. It is believed that such increases in the toughness of the interphase enable the simultaneous achievement of high stress and ductility in the final composite. Filler treatments which rely solely on increased adhesion, i.e., coupling, between the filler surface and the matrix polymer, can increase the composite strength, but, if there is no improvement in interphase toughness, the composite will remain brittle. This concept is discussed in U.S. Pat. No. 4,385,136. The reinforcing additives include any organic compounds of the above description which do not contain any group or element adversely affecting the function of the polymer; filler; silane; or any other component of the composition. Suitable unsaturated organic compounds include ester diol 2,4-diacrylate, 1,4 butylene glycol diacrylate, diethylene glycol dimethacrylate, triallyl-s-triazine-2,4,6-(1H, 3H, 5H)-trione, triallyl mellitate, pentaerythritol triacrylate, polycaprolactone triacrylate, m-phenylene bis maleimide, dipentaerythritol pentacrylate, melamine triacrylate, epoxidized linseed oil/acrylate, triacryloyl hexahydro-s-triazine, trimethylolpropane trimaleate, trimethacryloyl hexahydro s-triazine, N,N-tetraacryloyl 1,6-diaminopyridine, 1,3-butylene glycol dimethacrylate, 1,3-butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bisalkyl glycol dicarbonate, triallyl cyanurate, acetyl triallyl citrate, divinyl benzene, dialkyl pthalate, tetraallyl methylenediamine, tetraallyl oxethane, 3-methyl-1,4,6-heptatriene; 1-10-decamethylene glycol dimethacrylate and di-, tri-, tetra , and pentaacrylates of poly(vinyl alcohol). In addition, the following low molecular weight polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, and partial alkyl esters of styrenemaleic anhydride oligomers.

It is preferred to employ polymerizable unsaturated organic compounds that have a high unsaturated level to molecular weight ratio. Therefore, the tri-, tetra-, and penta-acrylates of poly(vinyl alcohol) and the other tri-, tetra-, and penta-acrylates and methacrylates of polyols such as pentaerythritol, methylolpropane, and dipentaerythritol, as described above, are preferred.

The coupling agent, and reinforcing additive are each used in amounts of about 0.05 part by weight to about 0.5 part by weight for each 100 parts of copolymer. The effect can be maximized by the inclusion of suitable surfactants and free radical generators.

Examples of antioxidants are: hindered phenols such as tetrakis[methylene(3,5-di-tert-butyl-4-hydroxyhydrocinnamate)]methane and thiodiethylene bis(3,5-di-tert-butyl-4-hydroxy)hydrocinnamate; phosphites and phosphonites such as tris(2,4-di-tert-butylphenyl)-phosphite and di-tert-butylphenylphosphonite; various amines such as polymerized 2,2,4-trimethyl-1,2-dihydroguinoline; and silica. A tetrakis methane compound is preferred. Antioxidants are used in amounts of about 1 to about 5 parts by weight per hundred parts by weight of copolymer.

Subject composition is also useful as a sheath surrounding a glass core in fiber optics applications.

The patents mentioned in this specification are incorporated by reference herein.

The invention is illustrated by the following example. Parts are by weight based on 100 parts by weight of polymer except as otherwise noted.

EXAMPLE

Two sample formulations are blended and mixed in a Brabender mixing device at a temperature just below 140° C. for 5 minutes. One sample contains 2 parts by weight of the following organic peroxide: 2,5-dimethyl2,5-di(t-butyl peroxide)(hexyne-3).

The balance of the formulations is as follows: 100 parts of an ethylene/vinyl acetate copolymer having a melt index of 6 and a vinyl acetate content of 28 percent by weight; 180 parts of magnesium hydroxide; 2 parts of a coupling agent, gamma-methacryloxypropyltrimethoxysilane; and 1 part of an antioxidant, polymerized 2,2,4-trimethyl-1,2-dihydroxy quinoline.

The samples are processed as required for the Vertical Burning Test for Classifying Materials on the test is carried out. For a description of the test, see Plastics Flammability and Combustion Toxicology, Landrock, Noyes Publications, Park Ridge, N.J., 1983, pages 157 and 158. The formulation containing the organic peroxide is found to be essentially free of drip while the formulation without the organic perioxide exhibits drip.

I claim:

1. A cable comprising a metal core conductor having an electrical current running therethrough and at least one uncrosslinked layer surrounding the core consisting essentially of:
   (i) a crosslinkable thermoplastic polymer;
   (ii) a metal hydrate flame retardant compound; and
   (iii) essentially unreacted organic peroxide crosslinking compound, which decomposes at a temperature of at least about 140° C., but below the decomposition temperature of the polymer.

2. The cable defined in claim 1 wherein the metal hydrate is present in an amount of about 180 to about 350 parts by weight of metal hydrate per 100 parts by weight of polymer and the organic peroxide is present in an amount of about 0.1 to about 5 parts by weight of organic peroxide per 100 parts by weight of polymer.

3. The cable defined in claim 1 wherein the organic peroxide has at least a one hour half life decomposition temperature.

4. The cable defined in claim 1 wherein the polymer is a homopolymer of ethylene or a copolymer based on a major proportion of ethylene.

5. The composition defined in claim 1 wherein the polymer is non halogenated or halogenated.

6. The cable defined in claim 1 additionally containing at least one carboxylic acid having about 8 to about 24 carbon atoms or a metal salt thereof in an amount of 0.1 to about 5 parts by weight based on 100 parts by weight of metal hydrate.

7. The cable defined in claim 6 wherein the metal hydrate is surface treated with the carboxylic acid or metal salt.

8. The cable defined in claim 1 wherein the metal hydrate is present in an amount of about 200 to about 320 parts by weight based on 100 parts by weight of the polymer.

9. The cable defined in claim 1 wherein the metal hydrate is magnesium hydroxide.

10. The cable defined in claim 4 wherein the organic peroxide has at least a one hour half life decable temperature.

11. The cable defined in claim 1 wherein the organic peroxide is an organic hydroperoxide.

* * * * *

UNITED STATES PATENT AND TRADEMARK OFFICE
CERTIFICATE OF CORRECTION

PATENT NO. : 4,952,428

DATED : August 28, 1990

INVENTOR(S) : M.J. Keogh

It is certified that error appears in the above-identified patent and that said Letters Patent is hereby corrected as shown below:

Column 6, line 32, change "decable" to -- decomposition --.

Signed and Sealed this

Twelfth Day of November, 1991

Attest:

HARRY F. MANBECK, JR.

*Attesting Officer*  *Commissioner of Patents and Trademarks*